United States Patent [19]

Strömer et al.

[11] 4,456,794
[45] Jun. 26, 1984

[54] FASTENING ARRANGEMENT FOR A HANDSET CASE HALVES

[75] Inventors: Carl-Axel Strömer, Bromma; Erling Tronslien, Tyresö; Jörgen F. Lindberg, Stockholm, all of Sweden

[73] Assignee: Telefonaktiebolaget LM Ericsson, Stockholm, Sweden

[21] Appl. No.: 384,977
[22] PCT Filed: Nov. 6, 1980
[86] PCT No.: PCT/SE80/00280
§ 371 Date: Jun. 4, 1982
§ 102(e) Date: Jun. 4, 1982
[87] PCT Pub. No.: WO82/01632
PCT Pub. Date: May 13, 1982

[51] Int. Cl.³ .............................................. H04M 1/03
[52] U.S. Cl. ..................................... 179/103; 179/179
[58] Field of Search .................. 179/103, 102, 100 R, 179/100 C, 100 D, 100 L, 178, 179

[56] References Cited

U.S. PATENT DOCUMENTS 4,099,034  7/1978  Peterson .......................... 179/178 X
4,163,875  8/1979  Cogan ................................. 179/103

FOREIGN PATENT DOCUMENTS 2460874  1/1976  Fed. Rep. of Germany ...... 179/178

OTHER PUBLICATIONS

Telephone Handset, H. D. Bales et al., Western Electric Technical Digest, No. 65, Jan. 1982, pp. 1-2.

Primary Examiner—Harold I. Pitts
Assistant Examiner—James L. Dwyer
Attorney, Agent, or Firm—Roberts, Spiecens & Cohen

[57] ABSTRACT

A fastening arrangement to keep together the parts of a handset consisting of two case halves. The microphone and/or the telephone receiver is kept in position in the case by a clamping element upon pressing the two case halves towards each other. The clamping element is provided with a gliding surface which is close to a support in the case half towards which the microphone or the telephone receiver is to be kept and when pressing the two halves together, the clamping element is pressed diagonally downwards. At this movement the clamping element grips a flange in the upper case half and presses it downwards, so that the case halves are securely kept together.

9 Claims, 6 Drawing Figures

FASTENING ARRANGEMENT FOR A HANDSET CASE HALVES

FIELD OF THE INVENTION

The present invention relates to a fastening arrangement to keep together the parts of a handset consisting of two case halves.

DESCRIPTION OF PRIOR ART

It is previously known to construct handset consisting of two case halves, a lower case part and an upper case part, which are kept together by means of screws in the hand gripping part. When mounting, the microphone and the telephone receiver are placed in the lower part, the upper case half being hooked at one of the short ends of the lower part and the screws in the hand gripping part being tightened, whereby the two case halves are pressed towards each other. By tightening the screws the microphone and the telephone receiver are also pressed against the bottom of the lower part by means of clamping rings or straps. Depending on the distance between the fastening screws and the end of the case where the halves are to be pressed together, bending strains with associated cracks can arise.

SUMMARY OF THE INVENTION

An object of the invention is to provide an arrangement eliminating the mentioned bending strains by firmly keeping together the remote ends of the case halves.

In accordance with the above and further object of the invention, a clamping means is provided for engaging upper and lower case parts of a telephone receiver to press the parts together upon tightening of a fastening means while concurrently pressing a microphone and/or a telephone receiver against the lower case part.

The clamping means includes a clamping body acted on by the fastening means during tightening thereof so as to be displaced from an initial position to a displaced positon.

The clamping body has a sliding surface which rides on a support on one of the case parts during tightening of the fastening means Additionally, the clamping body has projections spaced from the sliding surface which are moved along a diagonal path as the clamping body travels to its displaced position to engage flanges on the upper case part to clamp the case parts together when the clamping body has been moved to its displaced position.

The clamping body further includes a projection for pressing the microphone and/or receiver against the lower case part when the clamping body has been moved to its displaced position in concurrence with the clamping of the case parts together by the engagement of the projections with the flanges.

BRIEF DESCRIPTION OF THE DRAWINGS

The invention will be more fully described below by means of an embodiment and with reference to the accompanying drawing in which.

PREFERRED EMBODIMENT

Figure 1:
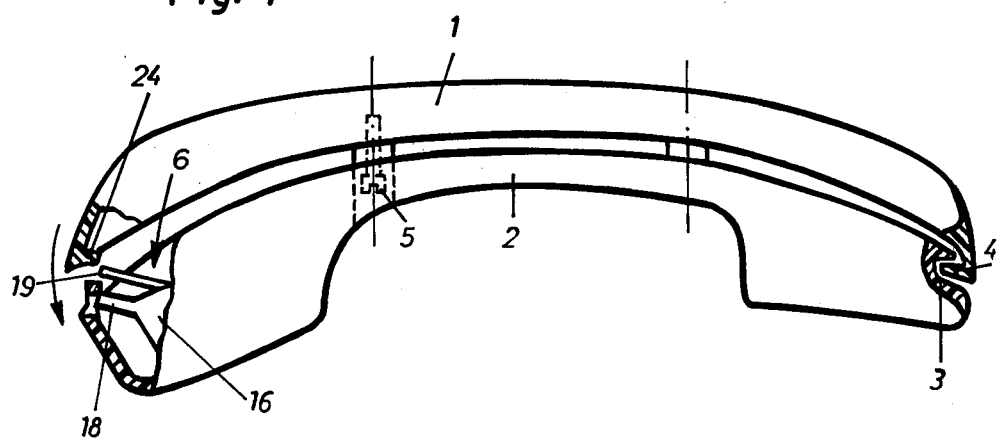
FIG. 1 is an elevational view, partly in section, of a hand set according to the invention upon fastening.
Figure 2:
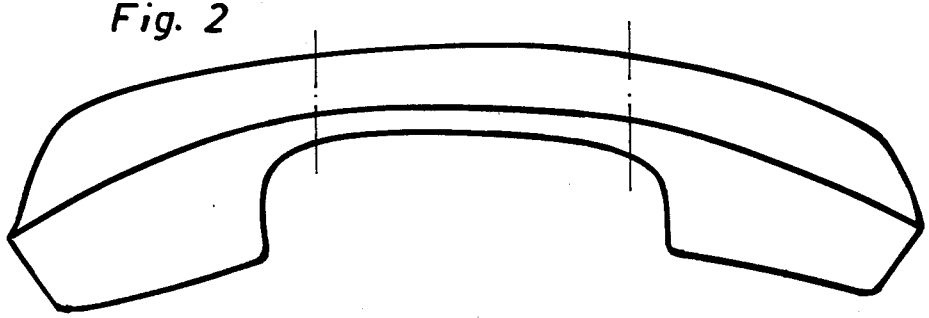
FIG. 2 shows the same set after the fastening.

The upper case half of the handset is designated 1 in FIG. 1 and the lower case half is designated 2. At one of its short ends the lower half or part is provided with a groove 3 into which a hook 4 on the upper half or part can engage, so that a turning point is attained around which the upper part can revolve until the opposite end in close contact with the end of the lower part.

In previously known handsets, the fastening has been carried out by means of screws which when tightened cause the two case halves to be pressed towards each other while a clamping ring or a strap presses a transducer constituted by a microphone and/or a telephone receiver, respectively, against the bottom of the lower case half. However, when pressing the ends of the case halves together by means of the screws, a considerable bending strain arises due to the distance between the screws and the end of the casing which can result in cracks. This is prevented by a clamping strap 6 according to the invention which is schematically indicated in FIG. 1 and whose purpose is not only to keep the microphone and/or the telephone receiver pressed against the bottom of the lower case half, but also to keep the two case halves pressed towards each other at one of their short ends. The clamping strap has two pairs of studs 7 and 8 at the short side of the handset which when tightening the case halves together are pushed outwards, one of the pairs 18 slipping into the lower case half 2 through the guide openings 25 at the same time as the pair of studs 19 is pushed diagonally downwards in order to engage a flange part 24 on the inside of the upper case half. Thus, the upper case half is pressed towards the lower one and is kept in a stable position so that bending strains are prevented as will be explained in greater detail below.

Figure 3:
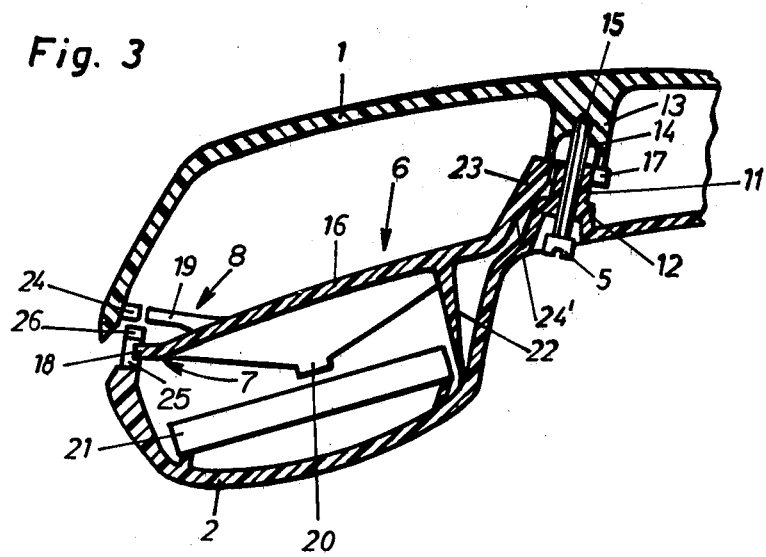
FIG. 3 shows in a cross-section, taken on line III—III in FIG. 6, the microphone end of the hand set upon mounting.
Figure 4:
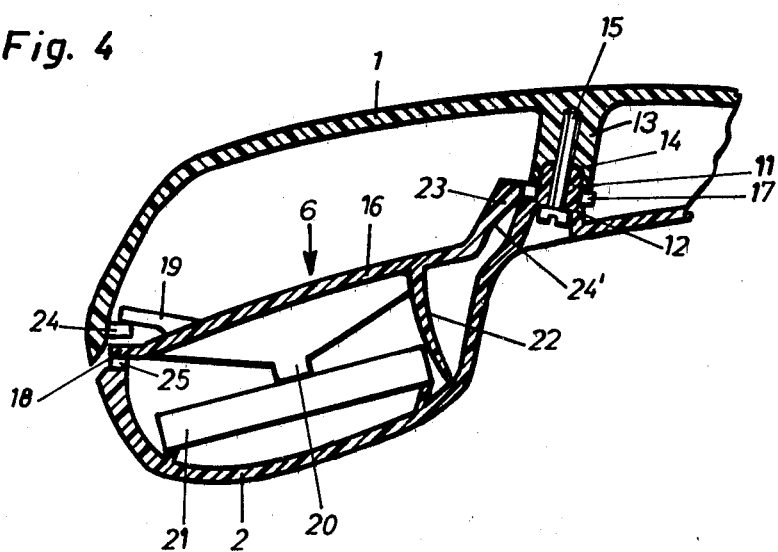
FIG. 4 shows the same arrangement as FIG. 3 in a mounted state.
Figure 5:
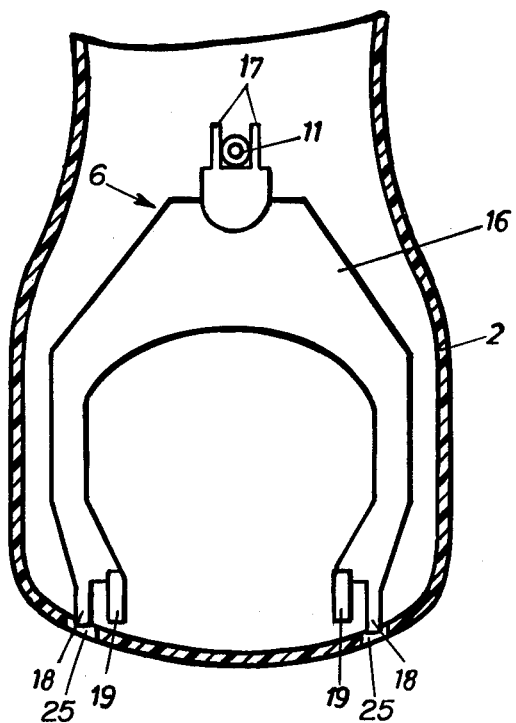
FIG. 5 shows the lower case half with a clamping strap in a planar view partly in section and FIG. 6 shows the hand set as seen from the microphone end, partly in section.
Figure 6:
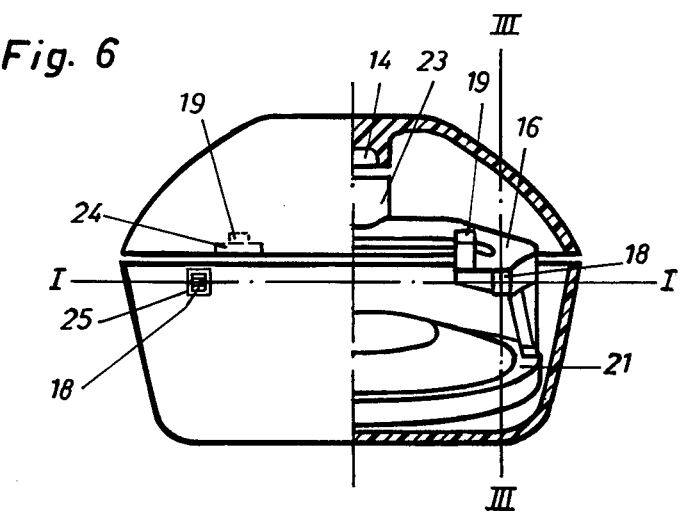

FIGS. 3 and 4 show the clamping strap and its function in connection with the fastening of the upper and the lower case halves. The lower case half 2 has a stud 11 extending inwards with a collar 12. Oppositely, on the upper case half, a stud 13 extending inwards is provided with a hole 14 for the stud 11 and is provided with a thread 15 into which screw 5 can be screwed in order to bring the two case halves closer together by tightening. The clamping strap 6 shown in FIG. 5 in an end view is of U-shape and comprises a body 16 with fork-shaped end 17, which grips around the stud 11 and, when the strap extends in the lower case half when mounting, is approximately on a level with the upper edge of the stud 11. The legs of the body 16 of the clamping strap are provided with pairs of claws 18 and 19, respectively, of which the claws 18, upon mounting, engage into holes 25 in the lower case half as it appears from FIGS. 3 and 5. The clamping strap is also provided with two projections 20 directed downwards whose purpose is to keep the microphone 21 in a pressed down position. Furthermore, the clamping strap is provided with a resilient arm 22 which elastically obstructs a displacement of the strap in a downward direction. Between the fork-shaped end of the clamping strap and the shanks there is a connection arm 23 forming an obtuse angle with these two parts, a slipping surface 24' on the inner side of the connection arm being in close contact with the collar 12. If now, after placing the strap 16 between the case halves as shown in FIG. 3, the screw 5 is tightened, the stud 11 is inserted into the hole 14, whereby the lower surface of the stud 11 exerts pressure against the fork 17 and the sliding surface 24' sliding alongside the edge of the collar 12. In this way the clamping strap 16 is pressed diagonally downwards with electric deformation of the arm 22 as it appears from FIG. 4. At the position according to FIG. 3, the strap 16 does not engage the upper case half, more specifically, the pairs of claws 19 are not in close contact with the flanges 24 on the inner side of the upper case half. FIG. 3 shows the position before the tightening of the screw 5 has started. In reality, however, the upper case half is already pressed down sufficiently so that the claws 19 are in a position higher than the flanges 24 when beginning the tightening of the screw. When, during the tightening, the clamping strap 16 is displaced diagonally downwards, the pairs of claws 19 grips over the flange 24 and presses this downwards at the same time as the pair of claws 18 is guided through the hole 25 in the outgoing direction. When the screw 5 is tightened, the two halves are completely locked relatively to each other and play or bending strains cannot arise. In FIG. 4 the wall part 26 (FIG. 3) has been removed to illustrate the position of the flange 24 after the locking.

What we claim is:

1. A handset comprising a lower case part adapted for receiving a transducer, an upper case part, fastening means for joining the upper and lower case parts together and clamping means engaging said parts for pressing said parts together upon tightening of said fastening means while pressing said transducer against the lower case part, said clamping means including a clamping body acted on by said fastening means during tightening thereof to be displaced from an initial position to a displaced position, said clamping body having a sliding surface and one of said case parts including a support on which said sliding surface travels during tightening of said fastening means, said clamping body including projection means spaced from said sliding surface which is moved along a diagonal path as said clamping body travels to said displaced position, said upper case part including flange means facing said projection means on said clamping body for being engaged by said projection means to clamp said case parts together when the clamping body has been moved to its displaced position, said clamping body further including means for pressing said transducer against said lower case part when said clamping body has been moved to its displaced position concurrently with the clamping of the case parts together by the projection means and the flange means.

2. A handset as claimed in claim 1 wherein said clamping body is of U-shape with opposed legs on which said projection means are mounted.

3. A handset as claimed in claim 1 wherein said means for pressing said transducer against said lower case part comprises a resilient arm extending from said clamping body and undergoing resilient deformation upon displacement of the clamping body.

4. A handset as claimed in claim 1 comprising guide means on said clamping body for guidably holding said clamping body during the displacement thereof to prevent movement transverely of said displacement.

5. A handset as claimed in claim 1 wherein said clamping body includes second projection means engaged in holes provided in said lower case part for being displaced and guided in said holes as the clamping body undergoes its displacement.

6. A handset as claimed in claim 1 wherein said support comprises a collar on one of said case parts, said sliding surface on the clamping body being angulated relative to said collar on which it rides to cause said clamping body to travel along said diagonal path.

7. A handset as claimed in claim 6 comprising a first stud on said collar, a second stud on the other of the case parts, said second stud having a guide hole in which said first stud travels as said fastening means is tightened.

8. A handset as claimed in claim 7 wherein said fastening means comprises a fastener abutting said collar and threadably engaged in said second stud, said second stud abutting against said clamping body.

9. A handset as claimed in claim 1 wherein said case parts include a hinge means at an end remote from the clamping means.

* * * * *